(12) United States Patent
Vezain et al.

(10) Patent No.: US 10,232,960 B2
(45) Date of Patent: Mar. 19, 2019

(54) MANIPULATION OF A SATELLITE IN SPACE

(71) Applicants: THALES, Courbevoie (FR); CENTRE NATIONAL D'ETUDES SPATIALES, Paris (FR)

(72) Inventors: Stéphane Vezain, Mandelieu (FR); Yannick Baudasse, Cannes la Bocca (FR); Didier Stanek, Cannes la Bocca (FR); Carole Billot, Cannes la Bocca (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 214 days.

(21) Appl. No.: 14/921,792

(22) Filed: Oct. 23, 2015

(65) Prior Publication Data
US 2016/0114912 A1    Apr. 28, 2016

(30) Foreign Application Priority Data

Oct. 24, 2014  (FR) ...................................... 14 02388
Jun. 26, 2015  (FR) ...................................... 15 01346

(51) Int. Cl.
*B64G 1/64*   (2006.01)
*B64G 4/00*   (2006.01)
*B64G 1/10*   (2006.01)

(52) U.S. Cl.
CPC ............. *B64G 1/641* (2013.01); *B64G 1/646* (2013.01); *B64G 4/00* (2013.01); *B64G 1/1078* (2013.01)

(58) Field of Classification Search
CPC ......... B64G 1/641; B64G 1/646; B64G 4/00; B64G 1/1078
See application file for complete search history.

(56) References Cited

U.S. PATENT DOCUMENTS 4,260,187 A * 4/1981 Frosch ................... B64G 1/646
                                                        244/172.5
4,664,344 A * 5/1987 Harwell ................. B64G 1/646
                                                        244/172.4

(Continued)

FOREIGN PATENT DOCUMENTS

CN       103 625 656 A      3/2014
FR           3006673 A1 *  12/2014 ........... B64G 1/1078

(Continued)

*Primary Examiner* — Valentina Xavier
(74) *Attorney, Agent, or Firm* — Baker & Hostetler LLP (57) ABSTRACT

A system for manipulating a space object in space comprises an articulated structure, wherein the articulated structure comprises a single actuator configured to control, equally, the deployment of the structure in space, the gripping of the space object and the folding down of the articulated structure. Developments describe the use of a fixed supporting structure, a threaded rod, a tapped whorl guided by the threaded rod and a set of articulated bars held by pivot links at their interfaces on the tapped whorl and on the fixed supporting structure. Various mechanical configurations are described, notably gripping devices comprising rollers for locking and/or unlocking the space object by separation of the articulated bars. A method of regulation, of control and of adjustment of the manipulation is provided.

16 Claims, 6 Drawing Sheets

(56) References Cited

U.S. PATENT DOCUMENTS

| | | | |
|---|---|---|---|
| 4,718,709 A * | 1/1988 | Myers | B25J 15/103 |
| | | | 244/172.4 |
| 5,040,748 A | 8/1991 | Torre et al. | |
| 6,969,030 B1 * | 11/2005 | Jones | B64G 1/646 |
| | | | 244/115 |
| 7,861,975 B2 * | 1/2011 | Behrens | B64G 1/1078 |
| | | | 244/158.1 |
| 9,840,342 B2 * | 12/2017 | Chambert | B64G 1/1078 |
| 2005/0103940 A1 * | 5/2005 | Bischof | B25J 15/10 |
| | | | 244/172.4 |
| 2007/0210212 A1 * | 9/2007 | Tchoryk, Jr. | B64G 1/646 |
| | | | 244/172.4 |
| 2015/0166202 A1 * | 6/2015 | Maediger | B64G 1/222 |
| | | | 244/171.1 |

FOREIGN PATENT DOCUMENTS

| | | | |
|---|---|---|---|
| JP | H02-160494 A | 6/1990 | |
| JP | H07-063245 A | 3/1995 | |

* cited by examiner

MANIPULATION OF A SATELLITE IN SPACE

CROSS-REFERENCE TO RELATED APPLICATION

This application claims priority to foreign French patent application Nos. FR 1402388, filed on Oct. 24, 2014 and FR 1501346, filed on Jun. 26, 2015, the disclosures of which are incorporated by reference in their entirety.

FIELD OF THE INVENTION

The invention relates to the field of satellites and in particular that of their transport in space.

BACKGROUND

Numerous satellite manipulations take place in space. For example, old satellites may be deorbited, satellites may be transferred to new orbits, yet others may be refuelled or else repaired.

The design and actual production of specific vehicles, i.e. vehicles dedicated to satellite transport, is a very recent development. Known solutions currently envisaged are generally based on the use of articulated arms. These solutions have many drawbacks. An "articulated arm" according to the prior art is a servo-controlled arm, generally using numerous actuators at the articulations (in order to allow as many degrees of freedom). Each actuator is associated with a probability of failure so that the overall reliability of an articulated arm is problematical. The storage of an arm (for example on launch) involves a need for significant stacking, which is not always technically or economically possible. This storage is also associated with a single point of failure, which is not always acceptable. Finally, an articulated arm can be difficult to drive or at the very least may involve significant programming efforts.

There exists a pressing industrial need for improved methods and systems, in particular that are reliable, for the manipulation of satellites in space.

SUMMARY OF THE INVENTION

A system is disclosed for manipulating a space object in space, the system comprising an articulated structure, characterized in that said articulated structure comprises a single actuator configured to control, equally, the deployment of said structure in space, the gripping of the space object and the folding down of said articulated structure.

In one development, the manipulation system comprises a fixed supporting structure and a threaded rod, said central threaded rod having a first end fixed to the output of the actuator and a second end having a pivot link with the fixed supporting structure, the manipulation system further comprising a tapped whorl guided by the threaded rod and a set of articulated bars held by pivot links at their interfaces on the tapped whorl and on the fixed supporting structure.

In one development, the manipulation system is stored in a folded-down configuration in a storage space of payload adapter or ACU type.

In one development, said set of articulated bars comprises three articulated bars.

In one development, said set of articulated bars comprises two articulated bars.

In one development, said set of articulated bars comprises at least four articulated bars.

In one development, the articulated bars are arranged substantially in parallelograms in a folded-down configuration and the articulated bars are terminated by gripping devices so as to retain a substantially constant gripping orientation.

In one development, one or more of the articulated bars have curved portions.

In one development, the articulated bars are terminated by gripping devices.

In one development, at least one gripping device comprises a plate, at least two rollers and an articulated support for said rollers.

In one development, the gripping device is arranged in such a way as to lock and/or unlock the space object by separation of the articulated bars.

In one development, the system comprises at least one sensor for determining the position of the space object.

In one development, the system comprises at least one sensor for determining a contact and/or the contact pressure with the space object.

In one development, the system further comprises a first stage or plate controlled by the single actuator.

In one development, the system further comprises a second stage or plate associated with the first stage and/or with the articulated structure, participating in the gripping of the space object and/or making it possible to guide fuel supply pipes.

In one development, the system further comprises a third stage bearing fuel supply interfaces.

In one development, said third stage is motorized independently of the single actuator.

A method is disclosed for manipulating a space object in space, the method comprising the steps of deploying an articulated structure by proceeding to rotate a single actuator in a first direction of rotation; and grasping the space object by folding down the articulated structure by proceeding to rotate the actuator in a second direction of rotation; said articulated structure comprising a single actuator configured to control, equally, the deployment of said structure in space, the gripping of the space object and the folding down of said articulated structure.

Generally, different directions of rotation can be used (the first direction of rotation being counter to the second direction of rotation). In one development of the method, corresponding to a particular implementation of the invention, the first direction of rotation and the second direction of rotation can be identical. In other words, according to a particular embodiment of the invention, a same direction of rotation can be used to deploy the structure and also to grasp the space object (and possibly also lock said object). This particular embodiment is advantageous because it notably reduces the risk of failure and makes it possible to perform the manipulation continuously. This variant embodiment relies on a particular configuration of the articulated bars.

In one development, the method further comprises a step of adjusting the rotation of the actuator as a function of data received from a sensor of position and/or of contact with the space object. The adjustment of the rotation can also be performed remotely, notably by an operator assisted by one or more cameras. The rotation adjustment can be entirely manual, entirely automatic or semi-automatic.

A computer program is disclosed comprising instructions which, when executed on a computer, make it possible to control the system described above.

According to one aspect of the invention, a system is disclosed for manipulating a satellite in space which comprises a mechanism with opening kinematics, which allows, with a single actuator, for a compact storage and the gripping of a space object.

In one development, the space object may comprise an interface of ACU (payload adapter) type.

Advantageously, the manipulation system according to the invention generally has an enhanced reliability compared to the existing systems. The small number of mechanical parts lessens the risk of failures. For example, the gripping of the targeted object is performed with the same actuator as that used for the actual deployment.

Advantageously, the manipulation system according to the invention is economical. The small number of mechanical parts also reduces the launch weight and the production costs and consequently reduces the cost of the overall system.

Advantageously, certain embodiments of the invention allow for a compact storage of the manipulation system. In particular, the storage inside an interface cone allows for a compact storage mode.

Again advantageously, according to a variant of the invention, the opening of the gripping arms can be wider than the interface of the object to be grasped or manipulated. The opening movement can be wider or more ample than the dimensions of the interface cone. The closure movement can also be performed reliably.

A variant of the mode of attachment of the space object proves particularly advantageous. A roller guiding mechanism allows for automatic locking. The releasing of the grasped object can be performed by separation. The surfaces of contact between the manipulation mechanism and the interface of the satellite can remain limited (commensurately reducing the risks of collisions or mechanical stresses and therefore damage).

BRIEF DESCRIPTION OF THE DRAWINGS

Different aspects and advantages of the invention will emerge in support of the description of a preferred but nonlimiting mode of implementation of the invention, with reference to the figures below.

DETAILED DESCRIPTION

The description of the embodiments of the invention takes place generally in space, i.e. in zero gravity. However, the gravitational force remains negligible compared to the mechanical forces presently applied, so that the various actions or operations or manipulations described here can be observed on Earth (subject to a few adaptations that do not affect the nature of the invention; for example, the space object does not float but is moored in some way).

A space object can be a satellite or a portion of satellite (artificial or natural), a piece of scrap, a tool, an element or portion of a space station, a measuring instrument, another satellite transport vehicle, a portion of space suit or even a launch vehicle stage.

Figure 1A:
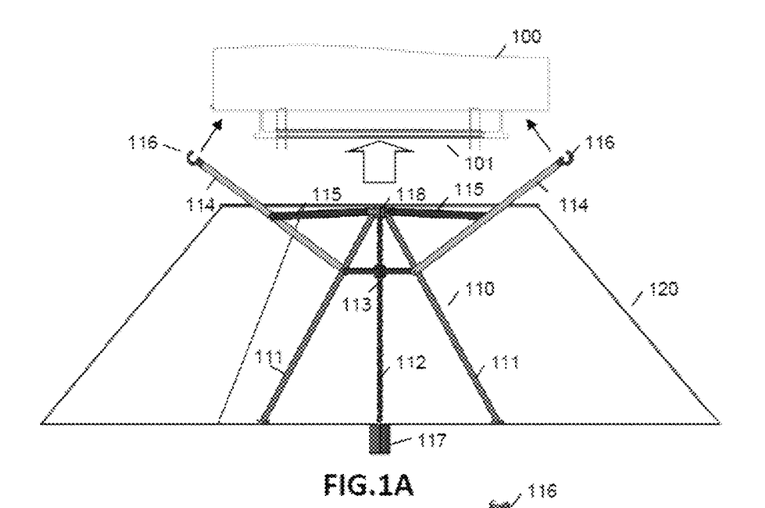
FIGS. 1A and 1B schematically illustrate one of the principles of the invention.
Figure 1B:
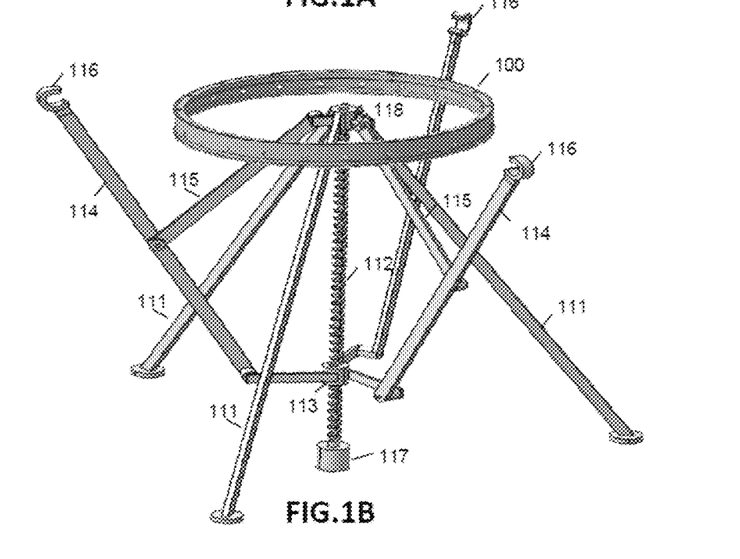

FIGS. 1A and 1B schematically illustrate one of the principles of the invention. FIG. 1A is a cross-sectional view and FIG. 1B is a perspective view. The figures show a satellite 100 having an interface 101 with the manipulation system 110. The manipulation system is situated (e.g. folded down or deployed or stored) in a storage space 120.

Generally, the storage space 120 can be any kind of housing, cavity, space, cache, shelter, protection or environment, suitable for the storage of the mechanism. In a particular advantageous case, the storage space can be a cone (or "interface cone"). In other embodiments, the storage space can be a cylinder or a parallelepipedal housing (or of any other geometrical form). The storage space can be rigid or else deformable.

The manipulation system 110 comprises a fixed supporting structure 111, a threaded rod 112, a whorl 113, a number of articulated bars (parts of a number of "arms") 114 and 115, a number of gripping appendages or terminations 116, a rotary actuator 117 (for example an electric motor) and an articulated junction 118.

An "arm" within the meaning of the invention does not comprise any motorization or actuation means (an arm comprises articulated bars, i.e. bars that are more or less rigid interacting with one another through the medium of junctions or articulations, generally fixed). The geometry (i.e. the form) of the arms or bars can be highly variable, as can the number (two or three or more). The arms can be rigid in certain embodiments but flexible and/or non-rigid arms can be used in other embodiments.

The actuator 117 is generally rotary (e.g. revolving motor) but certain embodiments can use pneumatic and/or linear actuators of piston type. In one embodiment, the rotary actuator may comprise (for example) a rotating motor which drives a rotating screw, which in turn drives a nut. The use of a "roller screw" (to use its usual name) can be recommended (said screw comprises a single screw and a roller nut). In other embodiments, it is possible to use a standard screw and nut or even a ball screw. It is also possible to use a linear actuator to displace the whorl in one direction or in another direction; the link of screw-nut type will then be replaced by a sliding link. The invention can generally use any device that makes it possible to drive the whorl in a vertical direction.

In one embodiment, the fixed supporting structure 111 is moored to the transfer vehicle also bearing the cone.

The fixed structure is generally rigid but can be elastic in certain embodiments. The materials which can be used for these structural parts comprise (but are not limited to) aluminium, titanium, steel or alloys. Composite materials can also be used (e.g. carbon composites, etc.).

The central threaded rod 112 has an end which is fixed to the output of the actuator 117 and another end which has a pivot link with the fixed supporting structure, a tapped whorl 113 guided by the threaded rod and a number of arms 114, which can consist of articulated bars 114 and 115 also articulated at their interfaces on the whorl and on the supporting structure.

In one embodiment, the mechanism comprises three arms (114, 115). A mechanism with three arms represents (currently) an advantageous trade-off between weight and gripping stability, given the current industrial demands and constraints (for example choice of materials, economic criteria).

A mechanism with two arms does however remain possible (for example if the mode of contact between the space object and the manipulation system allows it with sufficient robustness and/or reliability). A mechanism with more than 3 arms is also possible, at the price of a cost overhead in mechanical parts and ultimately in weight, although each arm can possibly be redimensioned (for example lightened).

The gripping appendages or terminations 116 can use a wide variety of means. For example, the gripping means can use (including in combination): hooks (for example passive and/or motorized), clamps, grips, appendages (for example magnetic or electromagnetic), suction systems, glue systems, etc.

Figure 2A:
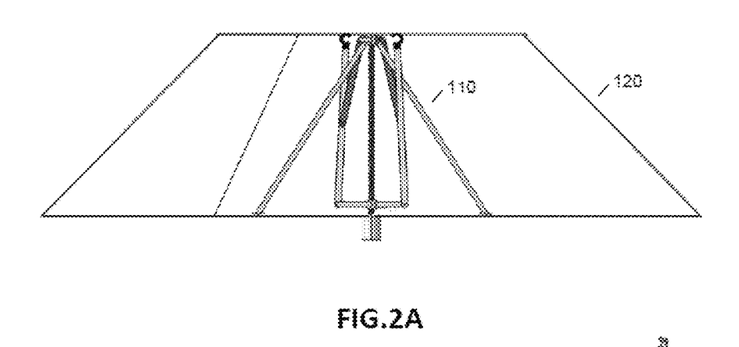
FIGS. 2A, 2B and 2C illustrate an example of storage of the satellite manipulation system according to a particular embodiment.

FIG. 2A illustrates an example of storage of the satellite manipulation system according to a particular embodiment. The figure shows the satellite manipulation system in a stored configuration in an interface cone 120.

In one embodiment, the storage space or interface cone 120 is of ACU (payload adapter) type. On launch, each satellite is fixed onto a support. This support is called payload adapter (ACU, Upper adapter and Lower adapter). An ACU generally comprises two parts: a part which remains on the launch vehicle and another part which remains on the satellite. In certain embodiments, a single part is required (i.e. one of the two elements to be connected does not require any specific attachment means). The nose cone is cast off as soon as the launch vehicle leaves the atmosphere. During the last phase of the flight, the separation of the ACU-satellite assembly is done by cutting, generally using a pyrotechnic bead.

Figure 2B:
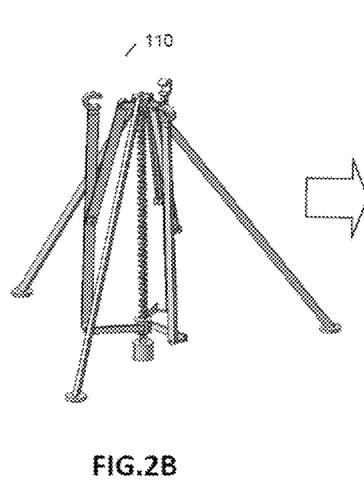
Figure 2C:
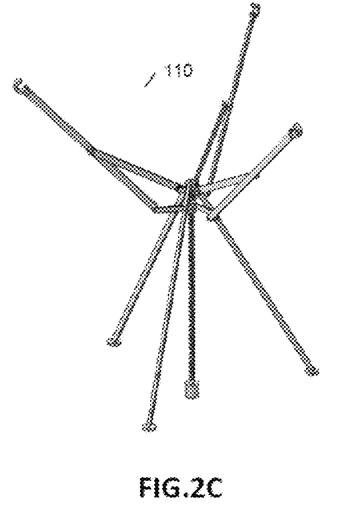

FIG. 2B illustrates the manipulation system in a folded-down or stored configuration, while FIG. 2C represents this same system in a deployed or unfolded configuration.

Figure 3A:
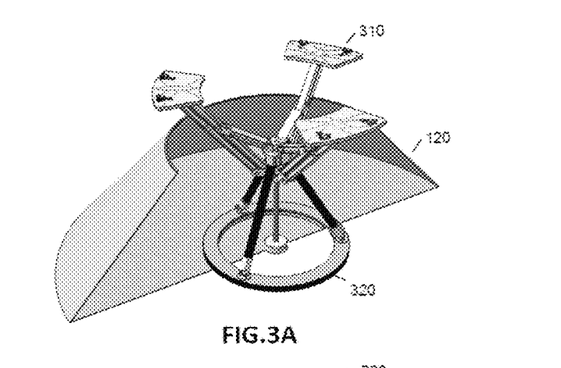
FIGS. 3A, 3B and 3C illustrate variant implementations.
Figure 3B:
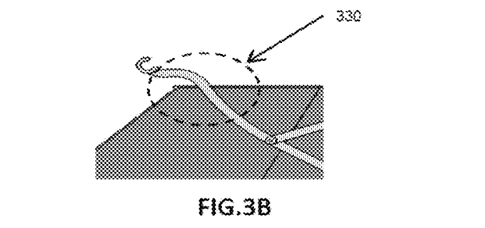
Figure 3C:
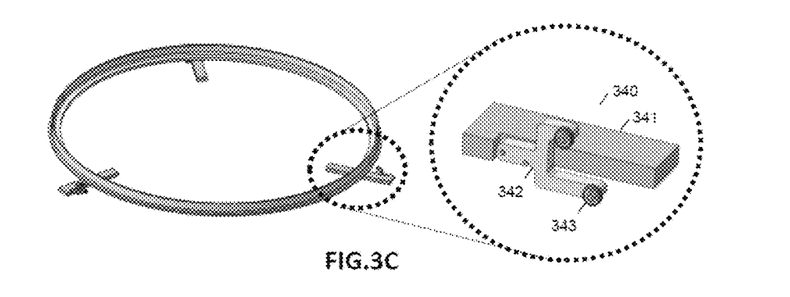
Figure 4A:
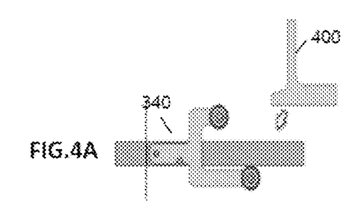
FIGS. 4A to 4I schematically illustrate the operation of a subassembly by detailing the main steps of locking and unlocking a space object.
Figure 4B:
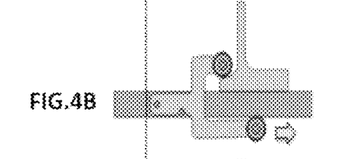
Figure 4C:
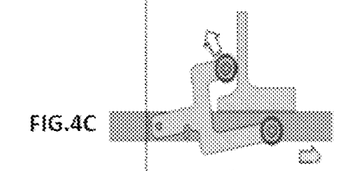
Figures 4D, 4E:
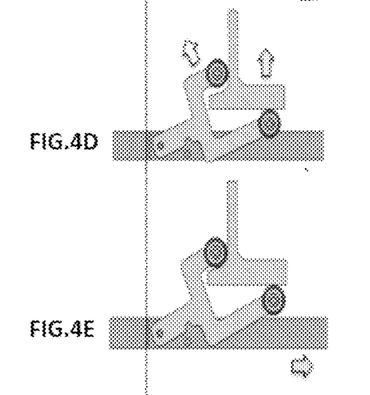
Figure 4F:
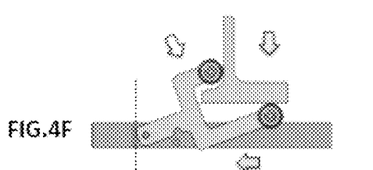
Figure 4G:
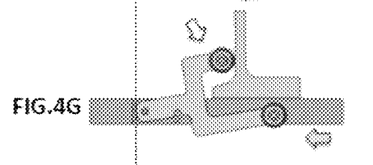
Figure 4H:
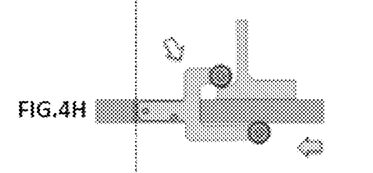
Figure 4I:
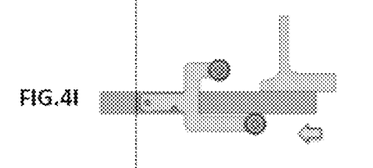

FIGS. 3A, 3B and 3C illustrate variant implementations which may be complementary to or substituted for the features previously described.

FIG. 3A represents a configuration in which the arms are arranged in parallelograms and the arms are terminated by gripping devices or appendages 310 that make it possible to retain a substantially constant orientation.

FIG. 3B illustrates a variant embodiment comprising curved arms 330 for optimizing the gripping aperture while avoiding collisions with or in the storage cone.

FIG. 3C illustrates a variant embodiment comprising a number of subassemblies 340 (for example three), distributed radially at regular angular intervals, so as to "catch" or "capture", i.e. grasp and hold, the interface of the targeted space object. The subassemblies 340 notably make it possible to "lock" (and respectively "unlock") the space object to be manipulated.

Each subassembly 340 consists of a plate 341, an articulated roller support 342 and at least two rollers 343.

FIGS. 4A to 4I schematically illustrate the operation of a subassembly by detailing the main steps of locking and unlocking a space object.

The steps 4A to 4E illustrate the locking or capture or grasping of the space object by a variant interface of the manipulation system according to the invention. In the step 4A, the interface 101 of the space object (100, 400) and the appendage (116, 340) of the manipulation system 110 according to the invention converge towards one another (the movement is relative). In the step 4B, the interface of the satellite 101 rests on the plate 341. In the step 4C, the two elements (interface and appendage) converge radially. The satellite interface then slips under the top roller and the top roller runs along the vertical (or inclined) part of the satellite interface which causes the roller support to pivot. The bottom roller then comes into contact with the bottom face of the satellite interface. In the step 4D, still under the effect of the radial convergence of the interface and of the appendage, the bottom roller raises the satellite interface while the top roller guides it vertically. In the step 4E, the top roller is wedged in the angle formed by the satellite interface. The whole is stabilized in balance under the effect of the horizontal actuation of the two elements.

The steps 4F to 4I illustrate the unlocking or the casting off or loosening or divesting or releasing of the space object by said variant interface of the manipulation system according to the invention.

In the step 4F, the subassemblies move apart radially: the space object is no longer "gripped". The interface of the satellite then drops back guided by the rollers. In the step 4G, the interface of the satellite 400 rests on the plate 341. In the step 4H, the subassemblies continue to move apart, freeing the satellite interface bit by bit. In the step 4I, the satellite interface is entirely freed and the satellite can then move freely.

A program (series of instructions) or software can be used to servo-control the manipulation system according to the invention. In particular, the program can control or regulate the manipulation of the space object by servo-controlling the single actuator (in the two directions of rotation). In some embodiments, sensors (or "detectors") can be used and make it possible to locate the space object, adjust the approach speed, determine one or more points of contact with the space object and possibly measure the different pressures at the different points of contact. Complementary means (for example computer vision) may make it possible to simulate the grasping of the space object, take into account or anticipate the specific relative movements of the space object (and the relative manoeuvres or movements specific to the transport vehicle) and thus adjust or optimize the operations of unfolding or of folding down the articulated structure in order to ultimately optimize or regulate the grasping of the space object.

Figure 5A:
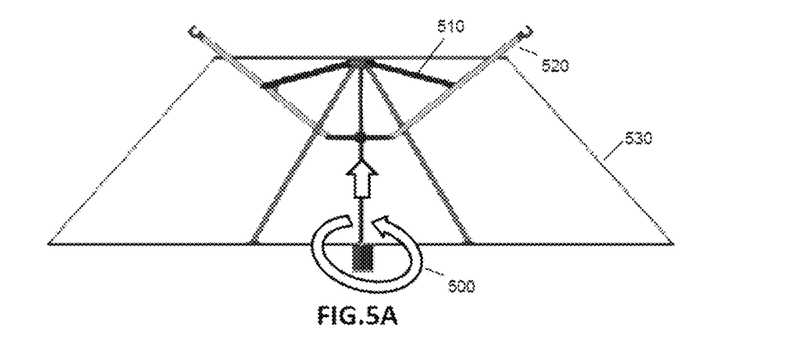
FIGS. 5A and 5B illustrate certain aspects relating to the rotation of the rotary actuator.
Figure 5B:
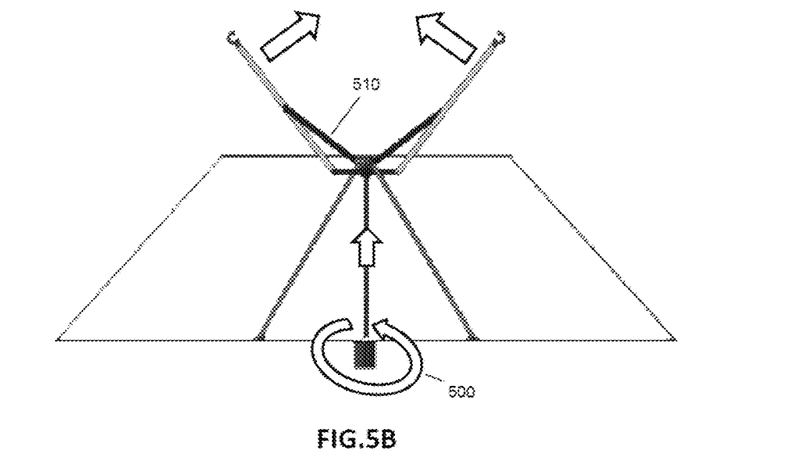

FIGS. 5A and 5B illustrate certain aspects relating to the rotation of the rotary actuator. Generally, the relative actuator can operate in two directions of rotation (i.e. counter-clockwise direction and clockwise direction). With certain articulated bar configurations, it is possible to use just one and the same direction of rotation to deploy the structure and also to grasp the space object (and possibly also lock said object). This configuration is illustrated in FIGS. 5A and 5B. FIG. 5A shows the deployment of the structure folded down when the rotary actuator starts to rotate in the direction 500. Held by the bars 510, the bars 520 are unfolded and disengaged from the storage space 530. In FIG. 5B, later in time, still in the direction of rotation 500 of the rotary actuator (i.e. in a "same direction" or an "identical direction"), constrained by the bars 510, the arms or bars 520 are tightened so as to grasp the space object (not represented). Thus, just one and the same direction of rotation of the rotary actuator is sufficient to perform the desired manipulation. This particular and advantageous configuration does not prevent other types of configuration using both directions of rotation of the actuator.

Figure 6:
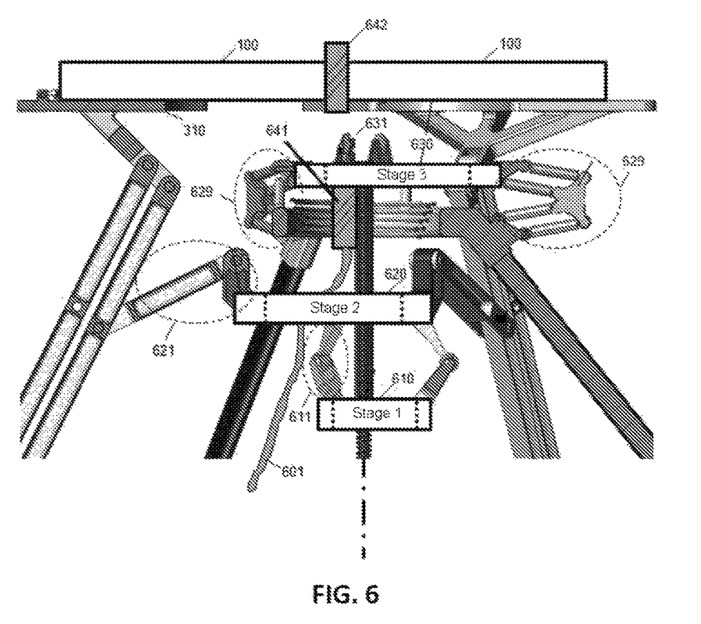
FIG. 6 illustrates a refinement of the invention.

FIG. 6 illustrates a refinement of the invention.

The architecture of the articulated bars can in effect form useful internal spaces for implementing numerous services or functions for the space object (e.g. power supply, repair, assistance, etc.).

In particular, a fuel supply function can be implemented. It is stressed that the refinement described hereinbelow is not limited to the supply of fuel: instead, or in addition, it is possible to establish connections of electrical type and/or exchanges of data via cables and/or of various other fluids (oxygen, etc.).

In one embodiment and according to the refinement of the invention, the system for manipulating a space object additionally comprises three stages (610, 620, 630) or plates associated with the articulated structure. These plates may be solid or openwork. The number of three stages is not essential: a single "internal" stage may be added.

The different additional stages or sets of articulated bars can be associated in different ways. In some embodiments, with the sets of articulated bars and/or the stages being coupled (i.e. being dependent on one another in some of their movements), the movement and/or the immobilization of one (for example the gripping system on the satellite interface) may lead to the movement and/or the immobilization of the other. The precise geometrical configuration (e.g. via the flexible pivots 610) allows for a variety of ranges of dynamic behaviours (delay effect, etc.).

The first stage 610 can, for example, be used to transmit the vertical translations transmitted from the single actuator.

The second stage 620 makes it possible (among other aspects) to guide or channel or restrict or limit or control the movement in space of the fuel supply pipes or couplings (the figure shows that the pipe 601 passes through the opening of the second stage, without being able in fact to become tangled in the device according to the invention). Generally, the second stage or plate can comprise guiding means adapted to guide one or more pipes to one or more valves external to the system for manipulating a space object. The guiding means can notably comprise one or more protection cylinders. Other guiding means are possible. The first stage and the second stage can be merged and form just a single stage.

The third stage 630 makes it possible to ensure the connection between the supply pipes and the matched interfaces present on the space object or satellite for the transfer of fuel, by making it possible, for example, to set up a fluidic connection between valves 641 and 642. Specific embodiments can provide very specific stages 3 (immobilizing by lugs, independent motorization, etc.).

Dynamically, an example of concerted operation of the three stages according to the refinement of the invention is illustrated in FIG. 6. Under the actuation of a gear motor, the stage 1 is raised, while connecting rods and flexible pivots maintain a mechanical load on the stage 2. The stage 1 actuates the stage 2 which proceeds to grasp the space object; the two stages then push the stage 3 onto which filling valves are fixed. This stage 3 is guided by a system of connecting rods in the form of a parallelogram and flexible pivots, enabling it to move vertically. As a result of the successive movements of the different stages, the valves are guided toward interfaces (for example satellite supply interfaces).

In more detail, in a particular embodiment, flexible pivots 611 can make it possible to link the stages 1 and 2. Advantageously, any collision impacts can be absorbed by these flexible pivots. Under the action of a gear motor rotating in the same direction as in deployment, the plates can be closed together to immobilize the satellite by a self-immobilizing gripping system.

In one embodiment, the various sets of articulated bars (the manipulation system and the system bearing the supply plate), i.e. the stages (610, 620, 630), are deployed or folded down by the same actuator implemented for the system for manipulating a space object according to the invention. Deriving from the same advantage, this embodiment is advantageous in that it requires a minimum number of mechanical parts and is therefore robust to failures.

In another embodiment, however, the system bearing the supply plate (for example the stage 3) can be motorized by a system independent of the single actuator implemented for the manipulation system according to the invention. This implementation notably avoids the possibility of a single point of failure.

In one embodiment, the deployment is ensured by a single actuator which consists of a gear motor, a screw and a ball nut or even roller nut. The gear motor actuates, for example, a screw in rotation, which has the effect of translating the first stage 610 and the second stage 620 in vertical translation (upward in the figure), by virtue of the nut linked to the stage 1. With the second stage 620 being linked to the first stage 610 by a system of bars with flexible pivots 611, it is translated vertically in the same manner. For its part, the second stage 620 actuates the articulated arms (via 621) which, by virtue of their particular kinematics, separate the plates (e.g. 310).

In one embodiment, the valves 641 and 642 are automatically aligned by a guiding system 629. For example, a specific stage 3 may consist of a fixed plate and a rotating plate on which the valves are mounted. A system of self-alignment of the valves can then be formed on the rotating plate. Such a system can use rollers 631 rolling over a cam, the cam being fixed onto the satellite interface; thus, based on the starting position, the rotating plate will pivot by a maximum of 90° to be aligned. In one embodiment, regarding the supply pipes or tubing, easing loops (not represented) will advantageously be able to "absorb" the rotation. In a particular embodiment, the rotating plate of the stage 3 can comprise a rotary interface onto which the stage 1 will come to bear.

Under the action of the gear motor, the valves, now aligned with their satellite interfaces, can be connected or coupled. Different types of connections can facilitate these couplings.

In one development, the manipulation system according to the invention comprises specific stacking elements, making it possible, for example, to grasp a space object "securely". For example, a rolling plate of a specifically adapted stage 3 will be able to be engaged with the screw and be translationally immobilized by lugs. To be unstacked upon the actuation of the gear motor, said screw will be able to be made to "let go" on the rotating plate; the guiding system of the stage 3 considered will then be able to resume a position of balance and free the rotating plate from the lugs.

The present invention can be implemented from hardware and/or software elements. In particular, a method for servo-controlling the mechanism may comprise different steps for managing or regulating the operations of deployment/folding down of the articulated structure (i.e. locking/unlocking a space object). Computer code instructions can make it possible, for example when executed on a computer, to perform said operations. One or more steps of the method can therefore be associated with a computer program product and/or a computer-readable medium. Said medium can be electronic, magnetic, optical or electromagnetic.

The invention claimed is:

1. A system for manipulating a space object in space, the system comprising an articulated structure, wherein the articulated structure comprises a single actuator configured to control, equally, the deployment of said structure in space, the gripping of the space object and the folding down of said articulated structure, wherein the manipulation system comprises a fixed supporting structure and a threaded rod, said central threaded rod having a first end fixed to the output of the actuator and a second end having a pivot link with the fixed supporting structure, the manipulation system further comprising a tapped whorl guided by the threaded rod and a set of articulated bars held by pivot links at their interfaces on the tapped whorl and on the fixed supporting structure.

2. The system according to claim 1, the manipulation system being stored in a folded-down configuration in a storage space of payload adapter or ACU type.

3. The system according to claim 1, said set of articulated bars comprising three articulated bars.

4. The system according to claim 1, said set of articulated bars comprising two articulated bars.

5. The system according to claim 1, said set of articulated bars comprising at least four articulated bars.

6. The system according to claim 1, in which the articulated bars and are arranged substantially in parallelograms in a folded-down configuration and said articulated bars are terminated by gripping devices so as to retain a substantially constant gripping orientation.

7. The system according to claim 1, in which one or more of the articulated bars have curved portions.

8. The system according to claim 1, said articulated bars 115 being terminated by gripping devices.

9. The system according to claim 8, at least one gripping device comprising a plate, at least two rollers and an articulated support for said rollers.

10. The system according to claim 9, the gripping device being arranged in such a way as to lock and/or unlock the space object by separation of the articulated bars.

11. The system according claim 1, comprising at least one sensor for determining the position of the space object.

12. The system according to claim 1, comprising at least one sensor for determining a contact and/or the contact pressure with the space object.

13. The system according to claim 1, further comprising a first stage or plate controlled by the single actuator.

14. The system according to claim 13, further comprising a second stage or plate associated with the first stage and/or with the articulated structure, participating in the gripping of the space object and/or making it possible to guide fuel supply pipes.

15. The system according to claim 14, further comprising a third stage bearing fuel supply interfaces.

16. The system according to claim 15, said third stage being motorized independently of the single actuator.

* * * * *